Figure 1:
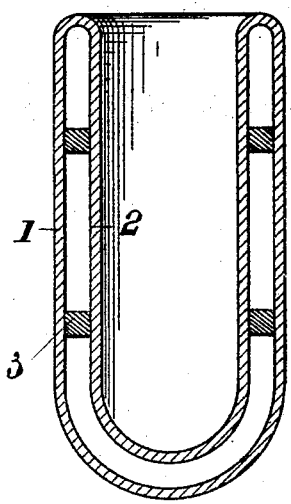

M. GUMBERT.
PROCESS OF MAKING DOUBLE WALLED GLASS VESSELS.
APPLICATION FILED FEB. 4, 1921.

1,411,781.
Patented Apr. 4, 1922.

Inventor:
Max Gumbert
By his Attorney
Archibald Cox

UNITED STATES PATENT OFFICE.

MAX GUMBERT, OF RUDOLSTADT, IN GREAT THURINGIA, GERMANY, ASSIGNOR TO THE FIRM ISOLA GESELLSCHAFT FÜR WÄRME- UND KÄLTE-ISOLIERUNG, OF RUDOLSTADT, IN GREAT THURINGIA, GERMANY, A GERMAN FIRM.

PROCESS OF MAKING DOUBLE-WALLED GLASS VESSELS.

1,411,781.      Specification of Letters Patent.      Patented Apr. 4, 1922.

Application filed February 4, 1921. Serial No. 442,563.

*To all whom it may concern:*

Be it known that I, MAX GUMBERT, citizen of Germany, residing at Rudolstadt, in Great Thuringia, Germany, have invented new and useful Improvements in Processes of Making Double-Walled Glass Vessels, of which the following is a specification.

The ordinary double-walled insulating vessels on the Dewar system which, on the one hand, serve for storing liquefied air and other liquefied gases and, on the other, for keeping food and drink cold or warm, are, as is well known, made of thin walled glass. The use of thin-walled glass has the disadvantage that breakage takes place very frequently both during the manufacture and also in the use of these vessels. This happens in an increased proportion when there is a question of manufacturing or using vessels of larger content especially such, as contain five or more litres. Dewar vessels with a content of more than five litres can hardly be made at all from thin walled glass and when they are successfully made they are liable to break very soon, especially on account of the great strain which takes place in both the glass vessels fused together when these are subjected to great variations of temperature.

In spite of these well known disadvantages Dewar vessels have gone on being manufactured from thin-walled glass because it seemed impossible to make them from thick-walled glass.

In the face of all previous conclusions the inventor has succeeded in manufacturing Dewar glass vessels from strong walled glass, i. e., from glass of a wall thickness or more than two millimetres. This was by no means to be anticipated since it had always to be feared that thick glass would not stand treatment by the blow-lamp, which is necessary in the manufacture of Dewar vessels for fusing together the two separate parts which form the double vessel, and even when this treatment of the glass was successful it was further to be feared that a thick walled glass would not stand the great differences of temperature to which Dewar vessels are necessarily subjected.

The surprising result has been brought about that it is possible to manufacture double-walled glass vessels on the Dewar system from thick-walled glass which can be subjected to the greatest sudden variations of temperature without breaking and without impairing their strength and which can, moreover owing to its great mechanical solidity compare very favourably with the previous ordinary Dewar vessels made from thin glass.

It has further been proved that it is also possible to manufacture from thick glass Dewar vessels of very large content, especially of a content of more than five, and even up to ten litres.

In the drawing one form of execution of the new double-walled vessel in accordance to the invention is represented by way of example. Figure 1 showing the new double-walled vessel in a longitudinal section, whereas Figure 2 represents a longitudinal section through a vessel on the old system, to show the difference of both systems.

The double-walled vessel shown in Figure 1 has the two walls 1 and 2 each having a considerable thickness. This thickness may for instance be about 3.5 mm. whereas the capacity of the double-walled vessel may for instance be 10 litres. Between the walls 1 and 2 supports 3 are arranged in the usual manner, said supports being made from asbestos or the like. A mirror-foil not to be seen in the drawing and consisting of silver, quicksilver or the like is arranged in the known manner on the insides of the walls 1 and 2 within the space between both walls, said space being evacuated.

Figure 2:
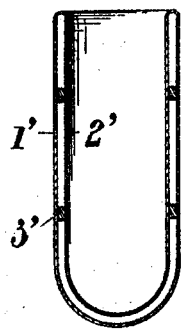

The double-walled vessel of the known kind shown in Figure 2 has only a by far smaller capacity and the thickness of the corresponding walls 1' and 2' is essentially smaller than that of the walls 1 and 2 of the vessel shown in Figure 1, the thickness of the former being for instance only 1.5 mm. Here also supports 3' of asbestos or the like are arranged between both walls 1' and 2'.

For the manufacture of the vessels in accordance to the invention it is essential that after putting the two single vessels one inside the other and after the subsequent fusing of the two mouth-edges by means of the blow lamp that the resulting double vessel should at once be put into a casing previously heated to a high temperature and together with this casing should as soon as possible be put into an oven previously heated to a high temperature wherein it is first of all heated still further and then slowly cooled. The casing should be of metal with a lining of asbestos, sand or the like or it may be made of any other substance capable of being heated to the required high temperature.

Naturally it is not every kind of glass that is suitable for the manufacture of double-walled vessels on the Dewar system. On the contrary only such glass is to be used for this purpose as can stand great variations of temperature, while still being able to permit treatment with the blow lamp. Certain kinds of glass which are used for the manufacture of glass gauges are to be regarded as of the first rank for this purpose.

For the manufacture of the new Dewar vessels the procedure is somewhat as follows:—

The single vessels or single parts made of thick walled-glass, for example of from three to four millimetres wall thickness, from which the double-walled vessel is to be made, are put one inside the other in the usual way and supported against one another. Next the adjacent edges of the two vessels, previously heated in the blow lamp are fully fused together. After the glass has again solidified, the whole material is put into a casing or form of metal, asbestos or like substance (capable of being heated to a high temperature) which is previously heated to a very high temperature, e. g., approximately 400–500° C. and the material together with this casing is put as soon as possible into an oven, which has also been previously heated to a high temperature preferably to approximately the same temperature as the casing.

This oven is then further heated to a higher temperature, e. g., 700–800° C. Next the oven is allowed to cool slowly and the completely cooled vessel is taken out for further working up. This subsequent working up, the deposition of the metallic film, the evacuation of the vessel and the fusing off of the evacuation outlet follow in the usual manner. The vessels so manufactured satisfy the previously mentioned conditions of strength and resistance. An essential part of the process is the special nature of the gradual cooling of the vessel, after the fusing together of the parts.

Hitherto, the process has been after the fusing together of the edges of the single vessels in the blow lamp, simply to allow the vessel to cool in the air and then to put it into the so-called cool oven which was now first raised to a higher temperature viz: approximately 300–400° C. and then again cooled off.

Treatment of this kind is not possible in the case of the manufacture of Dewar vessels from thick-walled glass. Both cylindrical vessels and those of different shape, e. g., narrow necked vessels may be made by this process. In the latter case not only must the edges of the two parts placed one inside the other be fused together, but the base of the outer vessel must be subsequently built up, preferably by drawing out the glass. As has been shown by experience it is possible by the method given to manufacture Dewar vessels of a wall thickness of upwards of five millimetres.

Having now particularly described and ascertained the nature of my said invention, I declare that what I claim is:—

1. A process for the manufacture of double-walled glass vessels on the Dewar system, of large size and of proportionately great wall thickness by fusing together the two mouth edges of the separate parts, placed one inside the other, by the blow-lamp, the thus formed double vessel being inserted immediately after said fusing into a casing of heat-resisting substance, brought before to a high temperature, said double vessel within said heated casing being placed then without delay in an oven previously heated to a high temperature, whereupon said double vessel is allowed to cool off slowly with and in said oven.

2. A process for the manufacture of double-walled glass vessels on the Dewar system, of large size and of proportionately great wall thickness by fusing together the two mouth edges of the separate parts, placed one inside the other, by the blow-lamp, the thus formed double vessel being inserted immediately after said fusing into a casing of heat-resisting substance, brought before to a high temperature, said double vessel within said heated casing being placed then without delay in an oven previously heated to a high temperature, whereupon said oven is firstly heated to a still higher temperature and said double vessel is thereafter allowed to cool off slowly with and in said oven.

In testimony whereof I have hereunto set my hand in presence of two subscribing witnesses.

MAX GUMBERT.

Witnesses:
  GEORG BLEAR,
  SIMTHER HOFMANN.